United States Patent [19]

Eichenauer et al.

[11] Patent Number: 4,771,109
[45] Date of Patent: Sep. 13, 1988

[54] GRAFT POLYMERS ON RUBBER POLYMERS WITH A BLOCK-LIKE STRUCTURE

[75] Inventors: Herbert Eichenauer, Dormagen; Christian Lindner, Cologne; Karl-Heinz Ott, Leverkusen, all of Fed. Rep. of Germany

[73] Assignee: Bayer Aktiengesellschaft, Leverkusen, Fed. Rep. of Germany

[21] Appl. No.: 17,729

[22] Filed: Feb. 24, 1987

[30] Foreign Application Priority Data

Mar. 4, 1986 [DE] Fed. Rep. of Germany ....... 3606982

[51] Int. Cl.$^4$ ............................................. C08L 51/08
[52] U.S. Cl. .................................... 525/105; 525/403; 525/404; 525/446; 525/479
[58] Field of Search ................ 525/105, 479, 403, 446

[56] References Cited

U.S. PATENT DOCUMENTS

| | | | |
|---|---|---|---|
| 3,051,684 | 8/1962 | Morton et al. | 525/105 |
| 3,418,354 | 12/1968 | Wheeler | 525/479 |
| 3,691,257 | 9/1972 | Kendrick et al. | 525/105 |
| 4,032,499 | 6/1977 | Kreuzer et al. | 525/479 |
| 4,079,098 | 3/1978 | Rossmy et al. | 525/102 |
| 4,139,519 | 2/1979 | Itoh et al. | 525/105 |

*Primary Examiner*—Wilbert J. Briggs, Sr.
*Attorney, Agent, or Firm*—Connolly & Hutz

[57] ABSTRACT

Graft polymers of vinyl monomers or vinyl monomer mixtures on block copolymers of recurring structural units from the polysiloxane series and recurring structural units from the series comprising homo- and copolymers of conjugated dienes as grafting bases.

4 Claims, No Drawings

GRAFT POLYMERS ON RUBBER POLYMERS WITH A BLOCK-LIKE STRUCTURE

The invention relates to new graft polymers of vinyl monomers and vinyl monomer mixtures on graft bases which are block copolymers of recurring structural polysiloxane units and recurring structural units comprising homo- and copolymers of conjugated dienes.

There are known graft polymers of vinyl monomers or vinyl monomer mixtures on block copolymers which contain at least one polymer block with thermoplastic softening properties (i.e. a glass transition temperature far above room temperature), for example, the polystyrene;polybutadiene block copolymers grafted with styrene disclosed in German Offenlegungsschrift No. 1,941,018.

Graft polymers of vinyl monomers or vinyl monomer mixtures on block copolymers in which all polymer blocks constitute rubbers are as yet not known in the art.

It has been found that grafted products which are formed by polymerization of vinyl monomers or vinyl monomer mixtures in the presence of block polymers of polysiloxane segments, and segments which are derived from homo- or copolymers of conjugated dienes have particularly favorable properties, for example, high flexibility at low temperature.

The invention relates to graft polymers of
(a) 50 to 100 parts by weight of vinyl monomers or vinyl monomer mixtures on
(b) 10 to 200 parts by weight of a rubber polymer with a block-like structure of recurring structural units (I)

 (I)

and optionally recurring structural units (II)

 (II)

wherein
n and m are numbers to that the average molecular weight ($M_w$) of the rubber in 10,000 to 1,000,000, preferably 10,000 to 50,000 and 100,000 to 500,000, and wherein
A and A' are the same or different and represent bifunctional polysiloxane segments of the formula (III)

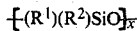 (III)

wherein
$R^1$ and $R^2$ denote aryl and/or alkyl,
x represents a number such that (III) has a molecular weight ($M_w$) of $>500$, preferably $>750$,
B represents bifunctional homo- and/or copolymer segments based on conjugated dienes, these segments having molecular weights ($M_w$) $>800$, preferably $>1000$,
C represents bifunctional aliphatic polyester and/or aliphatic polyether segments with molecular weights ($M_w$) $>800$, preferably 1,000,
and the glass transition temperatures of A, A', B and C is below 0° C., preferably below $-20°$ C.

The segments B of the rubbers employed as the grafting base are preferably butadiene homopolymers and butadiene copolymers. Particularly preferred are butadiene copolymers with up to 35X by weight, based on B, of copolymerized acrylonitrile, methacrylonitrile, styrene, halogenostyrene, p-methylstyrene, methacrylic acid esters with 1-12 C atoms in the alcohol component and acrylic acid esters with 1-12 C atoms in the alcohol component; preferred comonomers of butadiene are acrylonitrile, styrene, methyl methacrylate, n-butyl acrylate, ethyl acrylate and ethylhexyl acrylate.

Blocks A of the rubbers are polydialkyl-, polydiaryl- or polyarylalkylsiloxanes, in particular polydimethylsiloxane or polymethylphenylsiloxane radicals. They have block molecular weights of 500 to 20,000, in particular 1,000 to 10,000; they are largely linear.

Methods for manufcturing the rubbers used as a grafting base are known. Structural units I are obtained by reacting α,ω-bisacylated polyisloxanes (according to British Pat. No. 899,939) with hydroxyl terminated diene polymers (e.g. according to German patent 2,614,409). Structural units II are obtainable e.g. by reacting α,ω-bisacylated polysiloxanes with hydroxyl terminated polyesters or polyethers.

The segments C are preferably polyalkylene oxide segments with $C_{1-6}$-alkylene units or bifunctional polyester radicals i.e. polycondensates of aliphatic $C_{2-12}$-dicarboxylic acids and aliphatic $C_{2-12}$-dicarboxylic acids and aliphatic $C_{2-18}$-alkylendiols.

The polyester segments C are derived from aliphatic saturated or unsaturated dicarboxylic acids, for example from oxalic acid, succinic acid, adipic acid, azelaic acid, sebacic acid, carbonic acid, maleic acid, fumaric acid or butadienedicarboxylic acid. Particularly suitable diol components of the polyesters are ethanediol, butanediol, hexanediol, neopentylglycol, alkylene etherdiols with molecular weights of up to about 150 and unsaturated aliphatic diols, such as butenediols, and higher unsaturated dicarboxylic acids with more than 10 C atoms in the molecule. Suitable segments C are also polyalkyleneetherdiol radicals, for example polyformaldehyde radicals, polytetrahyrofuran radicals (polybutylene oxide radicals), polyethylene oxide radicals and copolymers thereof.

It is possible for not only polyester blocks or only polyester blocks to be present as the segments C. It is also possible for some of the segments C to be polyester and the other portion to be polyether, and finally segments C which contain ether and ester functions alongside one another as the segments C can also be present. If branched polyester or polyether components have also been employed, in addition to linear components, for the preparation of the block copolymers, block copolymers which have branched but non-crosslinked structures are contained.

Polyether or polyester blocks which themselves have a sequence or block structure, for example polyethylene oxide-polypropylene oxide block copolymer units and polyester-polyether block copolymer units, are also suitable as the segments C.

In the graft polymers according to the invention, the block copolymers employed as grafting bases can contain not only combinations of diene polymer blocks with polysiloxane blocks but also those which are additionally combined with aliphatic polyester and/or polyether segments. Particularly suitable grafting bases for the preparation of the graft polymers according to the invention are those polymers which contain, as copolymerized units, up to 20% by weight, in particular up to 10% by weight (based on the total weight of rubber base) of a polyester, in particular based on adipic acid, or a polyether with up to 4 C atoms in the alkylene group.

Suitable grafting monomers are vinyl aromatics, for example styrene, α-methylstyrene, p-methylstyrene, vinyltoluene and halogenostyrene, acrylic compounds, for example acrylonitrile, methacrylonitrile, (meth)acrylic acid esters with 1 to 12 C atoms in the alcohol component, for example methyl methacrylate, vinyl acetate or N-phenylmaleimide, and mixtures chosen from these monomers.

Graft polymers which contain styrene, α-methylstyrene, acrylonitrile, methyl methacrylate or mixtures thereof as the grafted-on monomers are preferred.

The amounts of grafted-on monomers are 10 to 500 parts by weight, preferably 25 to 400 parts by weight, and especially 30 to 300 parts by weight, based on 100 parts by weight of rubber; especially preferred monomers are mixtures of styrene and acrylonitrile in a weight ratio of 40;60 to 95.5 and methylmethacrylate (taken alone).

The invention also relates to a process for the preparation of the graft polymers according to the invention, which is characterized in that the abovementioned monomers or monomer mixtures are subjected to free radical polymerization in the presence of the block copolymers described above. The polymerization can be initiated by heat or by the addition of suitable initiators. Suitable initiators which form free radicals are organic and inorganic peroxides, for example benzoyl peroxide, inorganic persulphates, such as, for example, potassium persulphate, azo initiators, such as, for example, azobisisobutyronitrile, and redox systems which consist of an oxidizing agent, preferably a peroxide, and a reducing agent.

The polymers according to the invention can be prepared by bulk, solution, suspension or emulsion polymerization or by a combination of these processes in a manner which is known per se, and solution polymerization is preferred.

Suitable solvents here are, for example, (cyclo)aliphatic hydrocarbons, for example cyclohexane, aromatic hydrocarbons, for example toluene or ethylbenzene, halogenated aromatic hydrocarbons, for example chlorobenzene, ethers, ketones, amides and other compounds in which the reagents employed are soluble.

The grafting polymerization reaction can be carried out within a wide temperature range, and is preferably carried out between 30° C. and 200° C., particularly preferably between 50° C. and 150° C.

The graft polymers of the invention have excellent physical properties, especialy at low temperatures, good resistance to chemicals and solvents. They are suitable, optionally admixed with other polymers, for thermoplastic processing. In addition they are useful as tackifiers, as adhesive components, elastic coatings, sealing compositions and insulating material.

EXAMPLES

EXAMPLE 1

440 g of a rubber polymer with a block-like structure which has been prepared by reaction of 1,000 parts by weight of a copolymer of butadiene and acrylonitrile with terminal hydroxyl groups (acrylonitrile content=15% by weight, molecular weight determined from the OH number=5,000) and 800 parts by weight of an α,ω-bis-acetylated polydimethylsiloxane with a molecular weight of 4,000 (determined by acetyl determination are dissolved in 1,500 ml of ethylbenzene, 75.6 g of acrylonitrile, 194.4 g of styrene and 21.6 g of tert.-butyl perpivalate are added and the mixture is heated at 70° C. under nitrogen for 7 hours. Thereafter, 0.7 g of 2,6-di-tert.-butyl-4-methylphenol is added and the solvent is completely removed in vacuo. 7.03 g (99%) of an elastic graft polymer result.

Testing of the low temperature fracture properties according to DIN 53 372 was carried out on films with the dimensions 60×15×0.38 [mm]: not fractured down to −40° C.

EXAMPLE 2

440 g of the rubber polymer described in Example 1 with a block-like structure are dissolved in 1,500 ml of ethylbenzene, together with 200 g of methyl methacrylate, 15 g of tert.-butyl perpivalate are added and the mixture is heated at 70° C. under nigrogen for 7 hours. After addition of 0.7 g of 2,6-di-tert.-butyl-4methylphenol, the solvent was completely removed in vacuo. 616.7 g (96%) of graft rubber resulted.

Testing of the low temperature fracture properties according to DIN 53 372 was carried out on films with the dimensions 60×15×0.4 [mm]; not fractured down to −40° C.

EXAMPLE 3

394 g of a rubber polymer with a block-like structure which has been prepared by reaction of 1,000 parts by weight of a polybutadiene oil with terminal hydroxyl groups (molecular weight determined from the OH number=2,700) and 1,480 parts by weight of an α,ω-bis-acetylated polydimethylsiloxane with a molecular weight of 4,000 (determined by acetyl determination) are dissolved in 1,500 ml of ethylbenzene, 46.8 g of acrylonilrile, 120.4 g of styrene and 21.6 g of tert.-butyl perpivalate are added and the mixture is heated at 70° C. under nitrogen for 7 hours. After addition of 0.7 g of 2,6-di-tert.-butyl-4-methylphenol, the solvent was completely removed in vacuo. 537.2 (96%) of an elastic graft rubber resulted.

Testing of the low temperature fracture properties according to DIN 53 372 was carried out on films with the dimensions 60×15×0.4 [mm]; not fractured down to −70° C.

EXAMPLE 4 (Comparison Example)

300 of a styrene/butadiene block copolymer with a styrene content of 25% (18% block styrene content; ®BUNA BL 6578, Bunawerke Hüls) are dissolved in 1,800 ml of ethylbenzene, 63 g of acrylonitrile, 162 g of styrene and 21.6 g of tert.-butyl perpivalate are added and the mixture is heated at 70° C. under nitrogen for 7 hours. After addition of 0.7 g of 2,6-di-tert.-butyl-4-methylphenol, The solvent is completely removed in vacuo. 507.5 g (97%) of an elastic graft product result.

Testing of the low temperature fracture properties according to DIN 53 372 was carried out on films with the dimensions 60×15×0.39 [mm]: not fractured down to −25° C.

We claim:
1. Graft polymers of
(a) 50 to 100 parts by weight of vinyl monomers or vinyl monomer mixtures on
(b) 10 to 200 parts by weight of a rubber with a block-like structure of recurring structural units (I)

$$\{A - B\}_{\overline{n}} \qquad (I)$$

and optionally recurring structural units (II)

$$\{A'-C\}_{\overline{m}} \quad (II)$$

n and m being numbers so that the rubber polymers have average molecular weights ($M_w$) of 10,000 to 1,000,000, and A and A' being equal or different and represent bifunctional polysiloxane segments of the formula (III)

$$\{(R^1)(R^2)SiO\}_{\overline{x}} \quad (III)$$

wherein $R^1$ and $R^2$ denote aryl and/or alkyl, x represents a number such that (III) has a molecular weight ($M_w$) of >500, B represents bifunctional homo- and/or copolymer segments of conjugated dienes, these segments having molecular weights ($M_w$) >800, C represents bifunctional aliphatic polyester and/or aliphatic polyether segments with molecular weights ($M_w$) >800, the glass transition temperatures of A, A', B and C being below 0° C. and C, when present, being in an amount of up to 20% by weight based on the total weight of A, A', B and C.

2. Graft polymers according to claim 1 wherein the vinyl monomers are α-methylstyrene, acrylonitrile, methyl methacrylate or mixtures thereof.

3. Graft polymers according to claim 1, wherein segment B of the rubber represents a bifunctional radical of a butadiene homopolymer or copolymer with up to 35% by weight (based on B) of copolymerized acrylonitrile, styrene, methyl methacrylate and $C_1$-$C_{12}$-alkyl acrylate.

4. Process for the preparation of graft polymers, characterized in that vinyl monomers or vinyl monomer mixtures are subjected to free radical polymerization in the presence of a rubber polymer with a block-like structure of recurring structural units (I)

$$\{A-B\}_{\overline{n}} \quad (I)$$

and, optionally, recurring structural units (II)

$$\{A'-C\}_{\overline{m}} \quad (II)$$

wherein n and m are numbers to that the rubber has an average molecular weight ($M_w$) of 10,000 to 1,000,000, and A and A' being equal or different represent bifunctional polysiloxane segments of the formula (III)

$$\{(R^1)(R^2)SiO\}_{\overline{x}} \quad (III)$$

wherein $R^1$ and $R^2$ denote aryl and/or alkyl, x represents a number such that (III) has a molecular weight ($M_w$) of >500, B represents bifunctional homo- and/or copolymer segments of conjugated dienes, these segments having molecular weights ($M_w$) >800, C represents bifunctional aliphatic polyester and/or aliphatic polyether segments with molecular weights ($M_w$) >800, the glass transition temperatures of A, A', B and C being below 0° C. and C, when present, being in an amount of up to 20% by weight based on the total weight of A, A', B and C.

* * * * *